US012719927B2

(12) United States Patent
Duplys et al.

(10) Patent No.: US 12,719,927 B2
(45) Date of Patent: Aug. 25, 2026

(54) DETECTING ANOMALOUS COMMUNICATIONS

(71) Applicant: Robert Bosch GmbH, Stuttgart (DE)

(72) Inventors: Paulius Duplys, Markgroeningen (DE); Simon Greiner, Leonberg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 443 days.

(21) Appl. No.: 18/455,307

(22) Filed: Aug. 24, 2023

(65) Prior Publication Data

US 2024/0195837 A1 Jun. 13, 2024

(30) Foreign Application Priority Data

Dec. 12, 2022 (EP) .................................... 22212700

(51) Int. Cl.

*G06F 15/16* (2006.01)
*H04L 9/40* (2022.01)
*H04L 67/12* (2022.01)

(52) U.S. Cl.

CPC ...... *H04L 63/1491* (2013.01); *H04L 63/1416* (2013.01); *H04L 67/12* (2013.01)

(58) Field of Classification Search

CPC .. H04L 63/1491; H04L 63/1416; H04L 67/12
See application file for complete search history.

(56) References Cited

U.S. PATENT DOCUMENTS 10,521,584 B1 12/2019 Sharifi Mehr
2015/0074811 A1* 3/2015 Capalik .............. H04L 63/1408 726/23
2017/0353491 A1* 12/2017 Gukal ................ H04L 63/1491
2019/0058733 A1 2/2019 Wright
2021/0409446 A1* 12/2021 Di Mattia .......... H04L 63/1408
2023/0275877 A1* 8/2023 Harel ................ G01C 21/3822 713/189
2024/0155002 A1* 5/2024 Okada .................... H04L 67/12

FOREIGN PATENT DOCUMENTS

WO 2020068826 A1 4/2020

* cited by examiner

*Primary Examiner* — Normin Abedin

(74) *Attorney, Agent, or Firm* — NORTON ROSE FULBRIGHT US LLP

(57) ABSTRACT

A computer-implemented method for intrusion detection. The method includes detecting, at a first decoy instance hosted by an embedded device connected to a communications network, an intrusion event generated by an intruding instance that is not hosted by the embedded device, generating an intrusion event trace based on the detected intrusion event, and transmitting the intrusion event trace from the first decoy instance to a first intrusion detection instance that is communicably coupled to the embedded device.

21 Claims, 6 Drawing Sheets

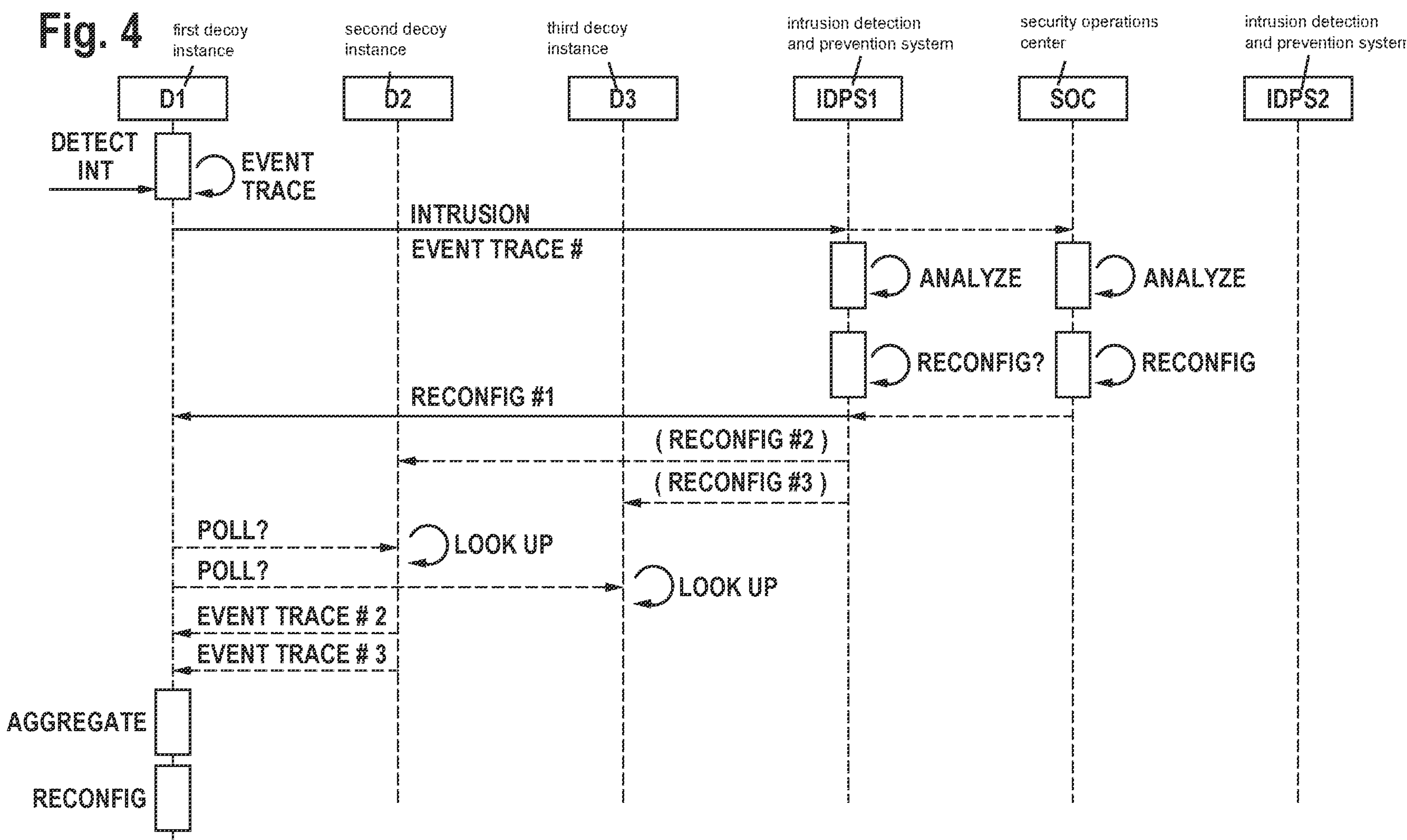
Fig. 4
first decoy instance
D1
second decoy instance
D2
third decoy instance
D3
intrusion detection and prevention system
IDPS1
security operations center
SOC
intrusion detection and prevention system
IDPS2
DETECT INT
EVENT TRACE
INTRUSION
EVENT TRACE #
ANALYZE
ANALYZE
RECONFIG?
RECONFIG
RECONFIG #1
( RECONFIG #2 )
( RECONFIG #3 )
POLL?
LOOK UP
POLL?
LOOK UP
EVENT TRACE # 2
EVENT TRACE # 3
AGGREGATE
RECONFIG first decoy instance
D1
second decoy instance
D2
third decoy instance
D3
intrusion detection and prevention system
IDPS1
security operations center
SOC
intrusion detection and prevention system
IDPS2
DETECT INT
EVENT TRACE
ANALYZE
ANALYZE
NACK
RECONFIG
RECONFIG
UPDATE
UPDATE
UPDATE
UPDATE
UPDATE
UPDATE
UPDATE
UPDATE

DETECTING ANOMALOUS COMMUNICATIONS

CROSS REFERENCE

The present application claims the benefit under 35 U.S.C. § 119 of European Patent Application No. EP 22 21 2700.3 filed on Dec. 12, 2022, which is expressly incorporated herein by reference in its entirety.

FIELD

This present invention relates to a computer-implemented method for intrusion detection, and an associated device, system, computer program element, and computer readable medium.

BACKGROUND INFORMATION

Securing embedded devices from external attacks, such as cyber attacks, is increasing in priority as an increasing number of embedded devices are connected to data communication networks such as Internet via, for example, mobile telecommunication systems. An example is in automotive electronics. Motor vehicles are increasingly being provided with tens or hundreds of embedded devices connecting to an internal vehicle network. The embedded devices may connect with computers outside of the motor vehicle via a gateway to a mobile telecommunication system. The attack surface, in other words the range of access possibilities available to intrusive software operated by cybercriminals against embedded devices, is increasing.

Intrusion detection and prevention systems are used in a multi-layered security paradigm as a defensive approach for protecting complex computing systems, but such systems may be further improved.

SUMMARY

According to a first aspect of the present invention, there is provided a computer-implemented method for intrusion detection comprising:

- detecting, at a first decoy instance hosted by an embedded device connected to a communications network, an intrusion event generated by an intruding instance that is not hosted by the embedded device;
- generating an intrusion event trace based on the detected intrusion event; and
- transmitting the intrusion event trace from the first decoy instance to a first
- intrusion detection instance that is communicably coupled to the embedded device.

In an example embodiment of the present invention, the device is an electronic control unit comprised in a vehicle.

Accordingly, one or more decoy instances can be used to collect information about the threat landscape of an embedded device in real-time, and/or about historical threats experienced by the embedded device. Observed intrusion events can be used to adapt the same, or other, decoy instances to enable intrusion detection and prevention systems to detect threats more comprehensively to network-connected embedded devices.

An intrusion detection and prevention approach according to the first aspect of the present invention can improve the utilisation of an embedded systems computational resources, and is quicker to detect new intrusions. The resource usage of an embedded device (in terms of power consumption, memory consumption, communication bandwidth consumption) is improved, because decoy instances can be dynamically provisioned to detect traces of evolving threats. Because decoy instances are targeted towards threats and intrusion types known to be operating within a target system, evolving threats can be tracked at a lower power and memory usage. For example, if a decoy instance is only required to track a subset of possible ports that are known to be targeted by a given intrusion vector, the decoy instance will require less memory and consume less power as compared to a decoy instance that must track all possible ports targeted by an unknown intrusion vector.

According to a second aspect of the present invention, there is provided a device comprising a communications interface, a processor, and a memory. The processor is configured to detect, at a first decoy instance hosted by the device, an intrusion event generated by an intruding instance that is not hosted by the device, to generate an intrusion event trace based on the detected intrusion event, and to transmit the intrusion event trace from the first decoy instance to a first intrusion detection instance that is communicably coupled to the device.

According to a third aspect of the present invention, there is provided a system comprising a device according to the second aspect, an intrusion detection system, and a communications network. The device is configured to communicate at least one intrusion event trace to the intrusion detection system via the communications network.

According to a fourth aspect of the present invention, there is provided a computer program element comprising machine readable instructions which, when executed by a processor, cause the processor to perform the computer implemented method according to the first aspect or its embodiments.

According to a fifth aspect of the present invention, there is provided a computer readable medium comprising the computer program element according to the fourth aspect.

According to an example embodiment of the present invention, the computer-implemented method for intrusion detection detects an intrusion to an embedded device comprised in a vehicle or industrial controller.

BRIEF DESCRIPTION OF THE DRAWINGS

Exemplary embodiments are depicted in the figures, which are not to be construed as limiting the present invention, and are explained in greater detail below.

FIG. 4 schematically illustrates an example of signalling in the intrusion detection systems of the first and second example embodiments of the present invention.

DETAILED DESCRIPTION OF EXAMPLE EMBODIMENTS

Figure 1:
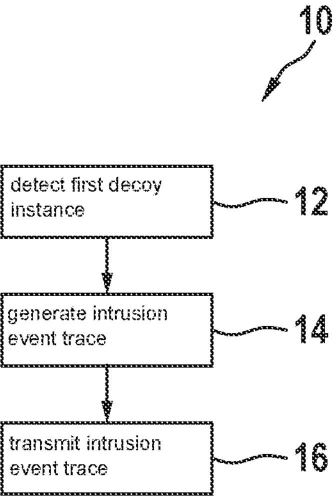
FIG. 1 schematically illustrates a method according to the first aspect of the present invention.

FIG. 1 schematically illustrates a method according to the first aspect.

Figure 2:
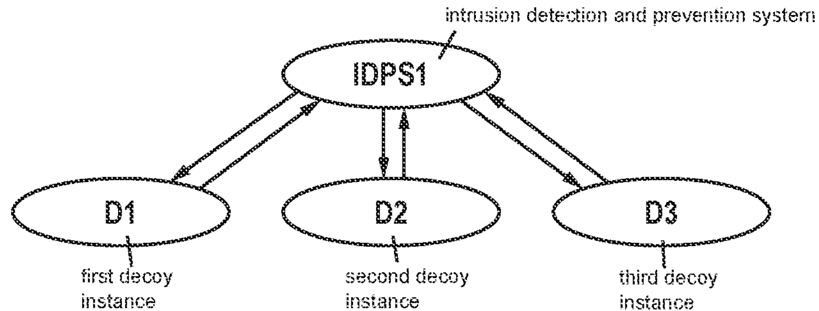
FIG. 2 schematically illustrates a first example embodiment of an intrusion detection system according to the present invention.

FIG. 2 shows an example of the intrusion detection and prevention system architecture proposed in this specification.

According to one example, the intrusion and detection prevention system may be implemented using decoy instances on a service-oriented communication system such as a system operating according to the "SOME/IP" standard ("Scalable Service-Oriented Middleware over IP"), intended to provide service-oriented communication in vehicles, although use of the "SOME/IP" standard is not essential and a skilled person will be able to adapt the teachings of this application to devices communicably coupled by other communication networks, such as CANBUS™, MOST, LIN, Ethernet, WiFi™, or Bluetooth™, for example.

The middleware (also named as an intermediate application layer, or a service layer) is arranged on levels 5 to 7 of the standard ISO/OSI communication layer model. SOME/IP uses one or both of TCP and UDP as the underlying transport protocol. SOME/IP enables applications logically connected to the service oriented communication system to communicate with each other, without knowing which specific instance, and/or ECU, the respective application is running on. "SOME/IP" has been incorporated into AUTOSAR™ since AUTOSAR version 4.

In addition to enabling the publishing or, and subscription to, services, "SOME/IP" facilitates service discovery. For example, instances in the service-oriented communication system can find offered services, and obtain endpoint identifiers, port numbers, or IP addresses associated with the offered services. In addition, "SOME/IP" offers functionality implementing "Remote Procedure Calls" (RPCs). In an RPC, an instance of the service-oriented communication system can call a function on another instance (such as a remote function or procedure) in such a way that the function is executed on the other instance, and any return values of the function are transmitted back to the calling instance via the service-oriented communication system.

Figure 8:
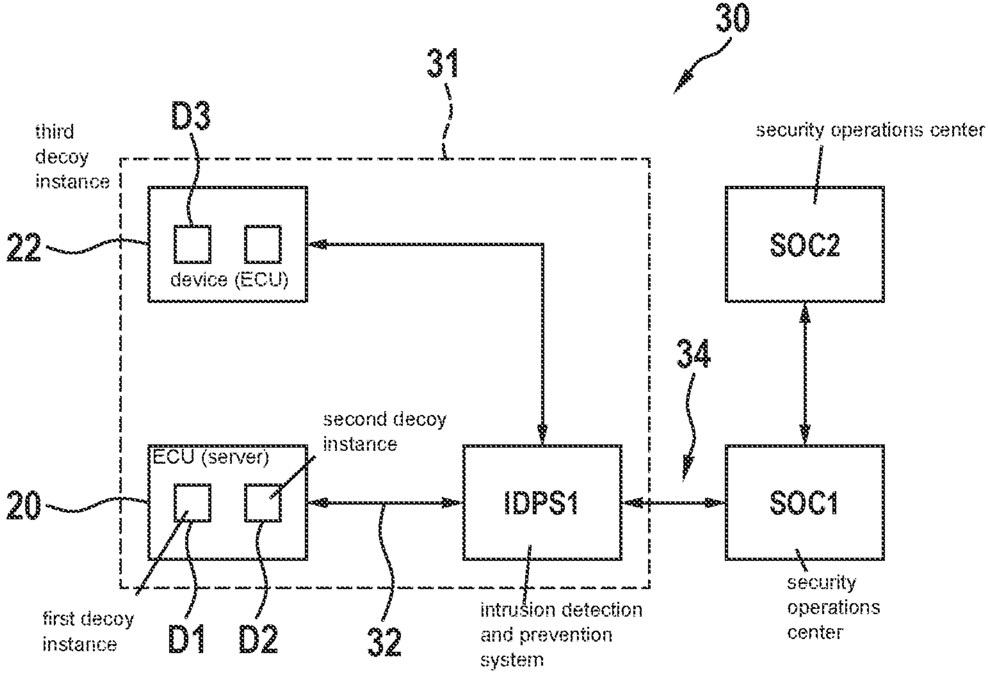
FIG. 8 schematically illustrates an intrusion detection system according to the third aspect of the present invention.

An example of an on-vehicle communication system, a service-oriented communications system, as illustrated in FIG. 8, may, for example, be comprised within a vehicle. A vehicle communications network 32 comprising Ethernet enables a plurality of devices Electronic Control Units (ECUs) to communicate with each other. In this simplified example, a device 22 (such as an ECU) that is logically coupled to the vehicle communications network 32 may function as an uncompromised server offering one or more services. A decoy instance operated by an ECU 20 (server) that is logically coupled to the vehicle communications network 32 offers one or more decoy services. A routing manager may act as middleware for the implementation of a service-oriented communications protocol. In one example, the service-oriented communications protocol is SOME/IP. An intrusion detection and prevention system IDPS1 is logically coupled to the vehicle communications network 32. For the purposes of this specification, it is assumed that ECUs 20 and/or 22 may be controlled by an intruder. For example, the ECU 22 may host malware in its memory. In this specification, the term "device" and "ECU" are used interchangeably.

A skilled person will appreciate that the example of a service-oriented communications system hosting a plurality of decoy instances for intruder detection is one example, and that many other types of embedded communication systems can be provided with ECUs that could host decoy instances such as, for example, Controller Area Network (CANBUS), Local Interconnect Network (LIN), Media Oriented Systems Transport (MOST), or Ethernet. ECUs can also be communicatively coupled using wireless communications such as WiFi™, Bluetooth™, or 3GPP systems. Furthermore, such networks can be connected together using gateways in arbitrary combinations.

In general, it is proposed to use one or more decoy instances hosted by an embedded device such as an ECU to collect information about the real-time threat landscape, such as attacks or vulnerabilities currently observed in the operating context of the decoy instance. Information collected by the decoy instance can be used to dynamically adapt the indicators of compromise (properties of a target embedded device) that are recorded, stored, processed, and optionally transmitted to an intrusion detection and prevention system IDPS to detect intrusions.

According to a first aspect, there is provided a computer-implemented method 10 for intrusion detection comprising:

detecting 12, at a first decoy instance D1 hosted by an embedded device 20 connected to a communications network, an intrusion event generated by an intruding instance that is not hosted by the embedded device;

generating 14 an intrusion event trace based on the detected intrusion event; and transmitting 16 the intrusion event trace from the first decoy instance D1 to a first intrusion detection instance IDPS1 that is communicably coupled to the embedded device.

FIG. 2 shows a first example of an IDPS. IDPS1 is communicably coupled to at least one decoy instance D1. In an example, decoy instance D1 is communicably coupled to a vehicle communication network 32. In an example, decoy instance D1 is located on a cloud computing service, or a publicly accessible server. In an example, decoy instance D1 is configured to emulate an electronic control unit of a target device.

For example, the cloud computing service can be configured to host a wrapper instance with a TCP/IP gateway to the public Internet. The wrapper instance simulates a communication network with a plurality of electronic control units. For example, the wrapper instance may comprise a simulation of a vehicular communication network. The wrapper instance may comprise a simulation of an "Internet of things" (IoT) network. The wrapper instance may comprise a simulation of an ethernet network. The wrapper instance may comprise at least one decoy instance representing, for example, an electronic control unit of a vehicle, a node of an IoT network, or an embedded computer connected to an ethernet network. Cyber-intruders are encouraged to penetrate and browse the simulated vehicular network, and their browsing of the system can be recorded and analysed according to techniques discussed herein, to enable the formulation of reconfiguration actions for elements of a real vehicular communication system. Alternatively, decoy instances can be provided inside a real vehicular communications system, with monitoring of evolving intrusion threats and protection of the communication system coexisting within the same network.

It is not essential that the technique is deployed a cloud computing service, and similar functionality can be performed using a server connected via a TCP/IP gateway to the public Internet. Furthermore, the technique according to the specification can be deployed in a user vehicle, IoT network, or embedded computer. For example, a vehicle communication network may comprise an electronic control unit ECU configured to host a decoy instance. In another example, the at least one decoy instance is hosted in a virtualized portion of another device, such as a functional device of a vehicle.

In whichever manner the at least one decoy instance D1 is implemented, the at least one decoy instance D1 is communicably coupled to at least one intrusion detection and prevention service IDPS1. In examples, a plurality of IDPS services are communicably coupled to at least one decoy instance D1. In examples, a one to one communication mapping exists between decoy instances D1 and IDPS services. In examples, a mapping between a plurality of decoy instances D1-D3 and a plurality of IDPS services is defined by an injective function (such as a many to many mapping, or a one to many mapping, or a many to one mapping).

The at least one decoy instance D1 functions, in colloquial terms, as a honeypot. In other words, the at least one decoy instance D1 does not have a functional purpose within the entity that hosts it. Instead, the decoy instance D1 appears on its connected communication network as available for communication with external entities connected to the communication network. Some of the external entities connected to the communication network may be related to the activities of intruders. The purpose of the decoy instance is to entice an intruder to attempt to communicate with the decoy instance, or to send a particular command to the decoy instance. Without the knowledge of the intruder, the decoy instance then communicates the interaction with the intruder with an IDP service.

To encourage an intruder to connect with the decoy instance D1, the decoy instance can be configured to resemble, or to “cloak” an instance that an intruder is expecting to find connected to a communication network of interest. In the case of a vehicular communication network, the decoy instance D1 can be configured to resemble an electronic control unit or infotainment system of the vehicle. In the case of an IoT system, the decoy instance D1 can be configured to resemble sensor of the IoT system. For example, the decoy instance can be configured to leave open network ports resembling a known electronic control unit or infotainment device. The decoy instance D1 can present the intruder with access to software “stubs” enabling an intruder to attempt to issue application programming interface (API) to the decoy instance.

In a vehicular application for example, the decoy instance D1 may obtain environmental information from other electronic control units of the vehicle to enable the software stub executed by the decoy instance D1 to offer a more convincing target to an intruder. For example, decoy instance D1 aiming to resemble a vehicle dashboard display may obtain speed and other vehicle status parameters from the vehicle control system.

According to the present specification, a “decoy instance” is hosted by an embedded device. The decoy instance is communicatively connected to a communications network 32 using a communications interface. The communications network may be one, or a combination, of a Controller Area Network (CANBUS), Local Interconnect Network (LIN), Media Oriented Systems Transport (MOST), or Ethernet network, or a wireless communications such as WiFi™, Bluetooth™, or 3GPP systems, or other such networks conventional to a skilled person.

According to an embodiment, detecting the intrusion event comprises monitoring at least one attribute of the first decoy instance during runtime, comparing the at least one attribute to a register of attributes, and if the at least one attribute is determined to be indicative of an intrusion event based on the comparison of the at least one attribute to the register of attributes, asserting that intrusion event has been detected.

According to an embodiment, the computer-implemented method further comprises, upon receiving, at the first intrusion detection instance IDPS1 the intrusion event trace: monitoring one or more attributes of a device 20 hosting the first decoy instance D1, determining at least one reaction based on the monitoring of the device 20, and communicating the reaction to the first decoy instance D1.

Accordingly, when one or more decoy instances D1 are accessed by an intruder the decoy instance D1 is configured to collect corresponding information about the intrusion. The information collected (the at least one attribute) is relative to the design of the decoy instance D1. In an example, the at least one attribute comprises a logical indication that an attempt to access the decoy instance has been made, with an indication of the network address of the intruder, and the TCP port that the intruder attempted to access. The attribute may comprise the time of attempted access.

An example of at least one attribute is which port was used to enter the at least one decoy instance by the external intruder, and/or which commands the external intruder used once connected to the decoy instance D1. Such attributes are indicators of comprise not only for the at least one decoy instance D1, but for other decoy instances D2, D3 of a monitoring system, and also for genuine electronic control units that do not have a decoy purpose, but a functional purpose within, for example, a vehicle or an IoT system.

When the decoy instance D1 is more advanced, it may host, for example, a stub of an application programming interface (API). Typically, an API is configured to receive commands from an external user and return information based on the command received. An example, the decoy instance D1 may host an API comprising a command line interface. The decoy instance D1 is configured to record the commands sent by the external user, and arguments. The at least one attribute may comprise the string of commands and arguments sent by the external user.

According to example, the decoy instance D1 may host a machine learning model capable of emulating an application programming interface (API) or another type of interface of an electronic control unit that the decoy instance is intended to be emulating. When an external intruder attempts to browse the command line of such a decoy instance D1, the machine learning model is configured to interact with the external intruder in a lifelike manner relative to the electronic control unit that the decoy instance is intended to be emulated. This may encourage an external intruder to interact in a more elaborate way with the decoy instance, such that a richer set of attributes accessed during an intrusion event can be reported to an intrusion detection service IDPS1.

Accordingly, examples of an “intrusion event trace” are a network address defining the origin of an external intruder (specific known virtual private network addresses or geographical locations may characterise an external intruder), an intrusion event trace may comprise a port number, sequence of port numbers, and a time delay between accessing the sequence of port numbers. An intrusion event trace may comprise one or more commands imparted to an API of the decoy instance by the intruders, and/or a sequence in which such commands are issued, and/or particular arguments of the commands, and/or the time delay between the commands.

According to an embodiment, an intrusion event comprises one, or any combination, of: a scan of network ports of the first decoy instance D1, an attempt to load an application hosted by the first decoy instance D1, at attempt to enter a predetermined command, or a predetermined combination of commands into an application hosted by the first decoy device; an attempt to download data from the first decoy instance D1, an attempt to write a data payload to a predetermined memory location in the first decoy instance D1, an attempt to operate an IO device from the first decoy instance D1, an attempt to communicate with a predetermined network address or URL from the first decoy instance D1.

Transmitting 14 the intrusion event trace from the at least one decoy instance D1 to the intrusion detection and prevention system may be performed in a reactive manner (as soon as an external intrusion is detected). Alternatively, an external intruder may be monitoring the communication of the at least one decoy instance D1, and a burst of unexpected communication from the at least one decoy instance D1 may reveal to the external intruder the presence of a "honeypot", and even the network location of the intrusion detection and prevention system. Accordingly, the at least one decoy instance D1 may be configured to store the intrusion event trace for transmission at a later, predetermined time. The at least one decoy instance D1 may be configured to obfuscate the intrusion event trace in stream of expected data. The least one decoy instance D1 may be configured to encrypt the intrusion event trace prior to transmission.

The at least one decoy instance D1 may be configured to transmit the intrusion event trace via at least one side-channel that is not available to the external intruder. For example, the at least one decoy instance D1 may establish a virtual private network with at least one intrusion detection and prevention system, and transmit intrusion event traces via the virtual private network to the at least one intrusion detection and prevention system.

When the IDPS1 receives the intrusion event trace, it may analyse the intrusion event trace and perform a series of actions such as registering events associated with the intrusion event trace as indicative of a new type of intrusion, or looking up the intrusion event trace in a register of attributes to examine whether or not the intrusion is a previously observed type of intrusion.

For example, malware that spreads by exploiting a specific weakness in a connected embedded device might unpack its payload into a specific file that is known to an intrusion detection and prevention system via, for example, a threat register. Once an intrusion detection and prevention system IDPS1 receives information from at least one decoy instance D1, the IDPS1 may activate monitoring of a corresponding location in the file system of the at least one decoy instance and store the name of that file, or hash of that file, as an attribute. When another decoy instances D2 detects the file from the file name or the hash in the file system of the other decoy instance, the IDPS1 may generate alarm, for example.

According to an embodiment, the computer-implemented method further comprises receiving, at the first intrusion detection instance IDPS1, the intrusion event trace from the first decoy instance D1, analyzing the intrusion event trace to determine a reconfiguration action to apply to the first decoy instance D1, transmitting the reconfiguration action to the first decoy instance D1 and reconfiguring the first decoy instance D1 based on the analysis of the intrusion event trace.

According to the present specification, examples of a "reconfiguration action" concern actions taken in response to the detection of an intrusion trace by a decoy instance to improve the performance of one or more decoy instances at detecting an external intruder, using information of a previous intrusion trace obtained by a first decoy instance D1. Improving performance means improving the likelihood that a given intrusion will be detected, and/or reducing processing, power, or memory overhead.

For example, a reconfiguration action may be opening or closing a selection of ports of the decoy instance, modifying the command tree of an application programming interface stub hosted by the decoy instance, furnishing the at least one decoy instance with one or more files or file types that may be of interest to an external intruder, and the like.

Figure 3:
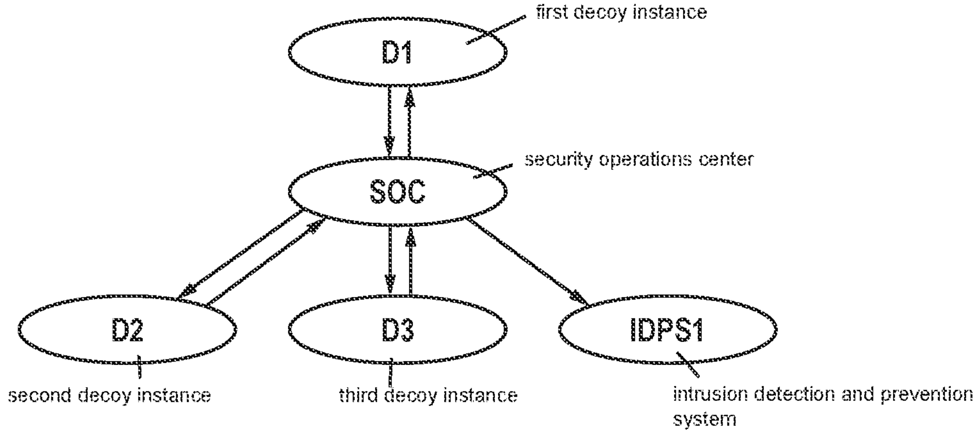
FIG. 3 schematically illustrates a second example embodiment of an intrusion detection system according to the present invention.

FIG. 3 schematically illustrates a second example of an intrusion detection system.

According to an embodiment, the computer-implemented method further comprises receiving the intrusion event trace at a security operations center SOC, analyzing the intrusion event trace using an automated or manual process at the security operations center SOC, and reconfiguring the first decoy instance D1 and/or the first intrusion detection instance based on the analysis.

A security operations center SOC is a communications end point having capabilities of performing advanced analysis on intrusion event traces. For example, automated analysis of the intrusion event traces can be performed by comparing the intrusion event traces to a large database of previously known intrusion event traces. The intrusion event traces can also be manually analysed by cybersecurity professionals. Accordingly, the security operations center SOC has an enhanced degree of intelligence when dealing with intrusion event is detected by decoy instances, as compared to the intrusion detection and prevention systems.

For example, the at least one decoy instance D1 may forward the intrusion event trace to a security operations center. In another case, the at least one decoy instance D1 may forward the intrusion event trace to an intrusion detection and prevention system IDPS1, and the intrusion detection and prevention system IDPS1 filters the intrusion event trace. The filtering may be performed based on whether, or not, the IDPS1 already recognises the intrusion event trace and has an up-to-date strategy for addressing the external intruder identified from the intrusion event trace. In an example, if the IDPS1 already recognises the intrusion event trace, it automatically performs strategy pre-loaded on the IDPS1 for addressing the external intruder.

The strategy may comprise, for example, reconfiguring one or more of the decoy instances, or loading or unloading files or software on one or more of the decoy instances and/or the functional instances connected to the communication network 32, and the like. A skilled person will appreciate that many strategies exist to address an external intruder once detected by a decoy instance.

According to an example, each IDPS instance is hosted by a device that also hosts a functional instance. Therefore, the IDPS instance protects device that has a functional purpose in the system.

In an example, if the IDPS1 does not recognise the intrusion event trace, it forwards the intrusion event trace to the security operations center and requests a strategy for addressing the external intruder.

According to an example, at least one, a plurality, or all of the intrusion event traces obtained by the at least one decoy instance D1 are forwarded to the security operations center SOC, optionally via the intrusion detection and prevention system IDPS1. Optionally, the intrusion event traces are directly communicated to the SOC from the at least one decoy instance D1.

At the security operations center SOC, the intrusion event traces can be processed in automated manner or manually analysed by security analyst. Based on the specific findings reported by one of the decoy instances, the security operations center SOC can enable a specific monitor in an IDPS1 connected to the at least one decoy instance D1. In another example, a security analyst can initiate an update or enhancement of the IDPS1 and/or of the decoy instance D1 with additional, or reduced, functionality. For example, the security analyst can write a new monitor instance to be hosted by the IDPS1, which is transmitted from the security operations center SOC to the IDPS1, via a software update or an over the air update.

In an example, the analysis performed at the security operations center SOC can include a combination of information received from several decoy instances. For example, the SOC may receive intrusion event traces sent by a plurality of decoy instances D1-3. The SOC may compare the intrusion event traces to identify whether, or not, an attacker performs the same attack against the different decoy instances. As another example, the SOC may compare the timing at which each decoy instance is attacked by the external intruder in order to identify a time correlation between attacks. Such comparisons enable the SOC to determine whether, or not, a series of activations of a plurality of decoy instances originates from the same external intruder, or from different external intruders.

FIG. 4 schematically illustrates an example of signalling in the intrusion detection systems of the first and second examples.

In the illustration of FIG. 4, signalling in a system comprising three decoy instances D1-D3, two intrusion detection and prevention systems IDPS1-2, and a security operations center SOC are illustrated. Initially, a first decoy instance D1 detects an intrusion. An intrusion event traces generated at the first decoy D1 based on one or more monitored attributes of the first decoy instance D1. The first decoy instance D1 transmits the first event trace to the first intrusion detection and prevention system IDPS1. The IDPS1 analyses the first intrusion event trace.

Optionally, the IDPS1 forwards the intrusion event trace to the security operations center SOC, so that the SOC can also analyse the first intrusion event trace. In the case were only the IDPS1 analyses the intrusion event trace, the IDPS1 functions autonomously from the SOC. In a monitoring mode where the IDPS1 forwards the first intrusion event trace to the SOC, the SOC is configured to monitor the first intrusion event trace but not to perform any response or reconfiguration of the IDPS1. This enables the SOC to maintain situational awareness of the threat environment in the communication network 32 without needing to control the IDPS1.

In an intervention mode, the SOC may receive the intrusion event trace from the IDPS1. Following analysis of the intrusion of the intrusion event trace, the SOC is configured to detect that the IDPS1 must be reconfigured. For example, the SOC may identify an intrusion event trace associated with a new threat that the IDPS1 does not yet have a strategy for addressing. Accordingly, in the intervention mode, the SOC is configured to update the operating software of the IDPS1 to address the new threat. In another option, the first decoy instance D1 is configured to transmit a copy of the intrusion event trace directly to the security operations center (not illustrated). Optionally, the SOC and the IDPS1 engage in a contention routine to determine which out of the SOC and the IDPS1 have the most appropriate strategy for addressing the new threat.

According to an embodiment, the computer-implemented method further comprises reconfiguring at least a second decoy instance D2, and/or functional instances based on the analysis of the intrusion event trace obtained at the first decoy instance D1.

Functional instances or nodes of the network 32 are not decoy instances, but perform a function such as engine control, or infotainment provision. Therefore, the IDPS1 and/or the SOC and also improve the security of functional nodes of the network 32 based on intrusion event detected at the decoy instances D1-D3.

If the analysis of the intrusion event trace by the IDPS1 and/or the SOC reveals a pattern consistent with a known threat, a reconfiguration action one or more decoy instances, or one or more functional instances, can be performed to combat the known threat. For example, a network intruder that targets a specific pattern of ports on a decoy instance could be tracked back to a specific malware vector by the IDPS1 and/or the SOC, and a specific reconfiguration action performed in response.

Following the analysis of the intrusion event trace at the IDPS1 and/or the SOC, either the IDPS1 or the SOC transmit to the first decoy instance D1 a reconfiguration message comprising a reconfiguration action, or command that the first decoy instance D1 must perform in response to detecting the intrusion event. In an example, the reconfiguration action is the installation of a software update comprising a strategy for addressing the intrusion event. Further decoy instances D2, D3 in the network 32 may also receive reconfiguration messages from the IDPS1. In an embodiment, the reconfiguration messages sent to the further decoy instances D2, D3 are identical to the reconfiguration message sent to the first decoy instance D1.

In an embodiment, the reconfiguration messages sent to the further decoy instances D2, are different to the reconfiguration message sent to the first decoy since D1. This embodiment is applicable, for example, when the further decoy instances D2, D3 are decoys of a different type compared to the first decoy instance D1. For example, the first decoy instance D1 may correspond to an infotainment system, and the second sequence was D2 may correspond to an engine controller. In a practical intrusion, an attacker could change their attack strategy per decoy based on the type of device being targeted in the attack, or change the order with which decoys are targeted based on the type of previous decoy or on the overall topology of the network 32. Accordingly, reconfiguration messages sent to nodes in the network 32 such as decoy instances can be heterogenous or homogenous.

The intrusion detection and prevention system IDPS1 and/or the SOC are optionally configured to send reconfiguration messages to functional nodes of the network 32 (not shown in FIG. 4).

For example, the reconfiguration action performed based on observations of the decoy instance D1 may comprise prevention routines specific to a detected threat. If the thread contains the change or creation of the file in a decoy instance by an external intruder, the prevention routine at the first decoy instance D1 provided by the reconfiguration action may comprise preventing the first decoy instance from changing or creating the file. If the external intruder establishes an additional connection to the decoy instance D1 (for example, to load malicious code) then the reconfiguration action can prevent connections to a specified address or address range associated with at least the first decoy instance D1, and/or other decoy instances D2-D3.

According to an embodiment, the computer-implemented method further comprises polling, via the first decoy instance D1 or the first intrusion detection instance IDPS1, a plurality of further decoy instances D2, D3 and/or further intrusion detection instances IDPS2, IDPS3 with the intrusion event trace, aggregating, at the first decoy instance D1 or the first intrusion detection instance IDPS1, a plurality of responses to the intrusion event trace from the plurality of further decoy instances D2, D3 and/or further intrusion detection instances IDPS2, IDPS3) and reconfiguring the first decoy instance D1 based on the aggregation of the responses from the further decoy instances D2, D3 and/or further intrusion detection instances IDPS2, IDPS3.

In an embodiment, after generating an intrusion event trace, the first decoy instance D1 identifies that it has no local reconfiguration response (strategy) for addressing an intrusion event characterised by the intrusion event trace. For example, the first decoy instance D1 may comprise a store of known intrusion event traces and associated reconfiguration actions. In this case, the first decoy instance D1 is configured to poll at least one other decoy instance D2 and/or an intrusion detection and prevention system IDPS1 in the network 32. Such polling may comprise, for example, the first decoy instance D1 sending a copy of the intrusion event trace to the at least one other decoy instance D2, and requesting that the at least one other decoy instance D2 or IDPS1 responds with a response strategy to the intrusion event trace, if the at least one other decoy instance D2 or IDPS1 recognises the intrusion event trace. Of course, functional instances can also poll decoy instances D1-D3 and/or the IDPS1 in a similar manner. In this way, an evolving cyber-attack can be addressed in a distributed manner in real-time because there is a high likelihood that other decoy instances D1-D3 or functional instances in the network 32 will have been targeted by the evolving cyber-attack, and will have previously been provisioned with response strategies or reconfiguration actions from the IDPS1 or the SOC.

The process of the first decoy instance D1 polling a plurality of decoy instances D2-D3 and/or IDPS instances may result in a large number of reconfiguration actions (response strategies) being received by the first decoy instance D1. Taken as a whole, the plurality of reconfiguration actions may be incoherent, and thus the first decoy instance D1 must aggregate the reconfiguration actions. Optionally, the aggregation comprises selecting one reconfiguration action out of the total number of reconfiguration actions available.

Figure 5:
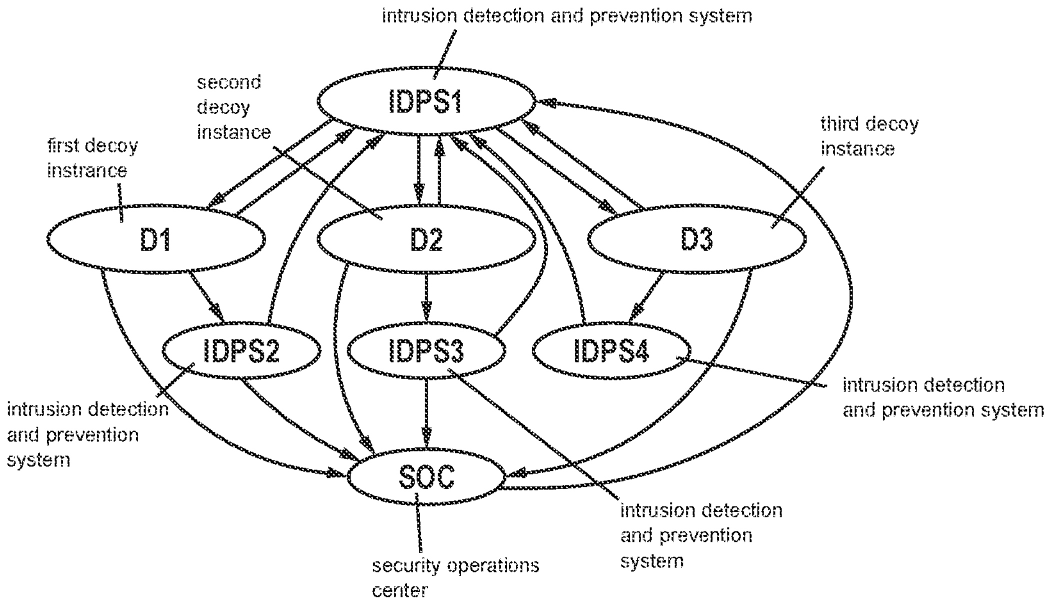
FIG. 5 schematically illustrates a third example embodiment of an intrusion detection system according to the present invention.

FIG. 5 schematically illustrates a third example of an intrusion detection system.

In the system, a first decoy instance D1 is communicatively coupled to a first IDPS1 and a second IDPS2, as well as the SOC. A second decoy instance D2 is communicatively coupled to the first IDPS1, a third IDPS3, and the SOC. A third decoy instance D3 is communicatively coupled to the first IDPS1, the fourth IDPS4, and the SOC. IDPS1 is communicatively coupled to the SOC.

Therefore, FIG. 5 illustrates a multi-agent intrusion detection and prevention system. The decoy instances are connected to a plurality of IDPS instances. When one of the decoy instances D1-D3 detects an intrusion event, the relevant decoy instance D1 can send an intrusion event trace to one, plurality, or all of the IDPS instances so that the intrusion event can be analysed. Reconfiguration strategies from one or more of the IDPS instances or the SOC are sent to a requesting decoy instance D1. In an example, the IDPS instances are hosted by embedded devices whereas the SOC is based in a large data center. This means that the IDPS instances can transfer large analysis tasks to the SOC, enabling a reduction of the power consumption, memory and compute requirements of the embedded devices hosting the IDPS instances. In addition, the SOC will have access to a greater database of potential security risks.

According to an embodiment, the computer-implemented method further comprises detecting, at a second decoy instance D2 hosted by the device 20, a second intrusion event generated by an intruding instance that is not hosted by the device, generating a second intrusion event trace based on the second detected intrusion event, transmitting the second intrusion event trace from the second decoy instance D2 to the first intrusion detection instance IDPS1 that is communicably coupled to the device, and reconfiguring the first D1 and/or second D2 decoy instances based on a time relationship between first and second intrusion events, and/or based on a functional comparison of the first and second intrusion events.

In this embodiment, a more advanced intrusion attempt into a network 32 can involve an intruder performing different intrusions for different types of functional instances (and correspondingly, the decoy instances that map to the functional instances). Based on a time relationship between the different types of intrusion event applied to different types of decoy instance, a signature characterising a specific type of network intrusion can be identified. Reconfiguration of the first and second decoy instances based on an attack identified according to the time difference between different types of network intrusions a different decoy instances enables more accurate tracking of a cross-network intrusion.

Figure 6:
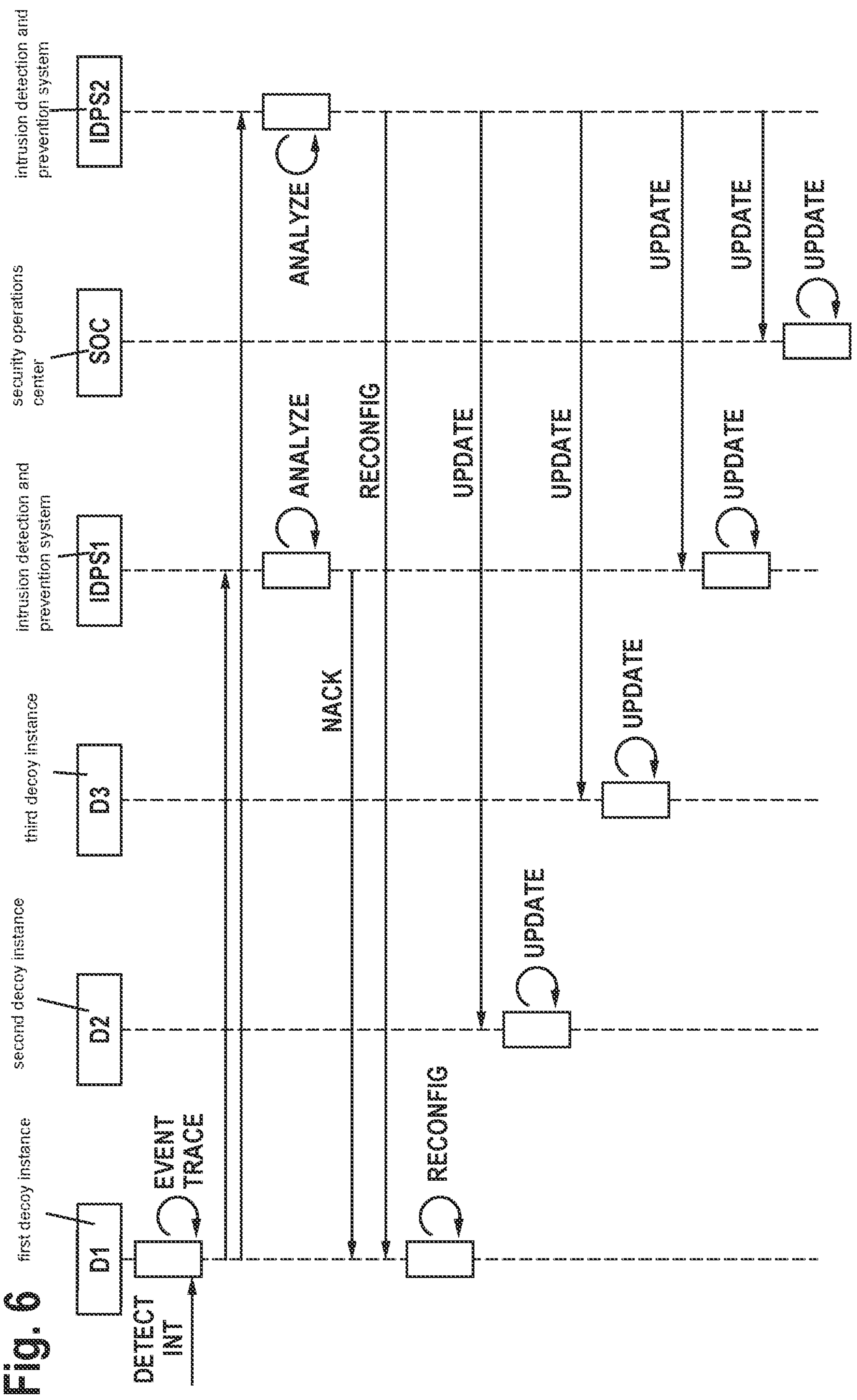
FIG. 6 schematically illustrates signalling in the intrusion detection systems of the third example embodiment of the present invention.

FIG. 6 schematically illustrates signalling in the intrusion detection systems of the third example.

The signalling illustrated in FIG. 6 shows a case where a first decoy instance D1 signals an intrusion event trace to IDPS1, which analyses the intrusion event trace and cannot match it to a reconfiguration command. Therefore, the IDPS1 returns a negative acknowledge to the first decoy instance D1. However, the IDPS2 analyses the same intrusion event trace sent by first decoy instance D1 to IDPS1, and finds a match resulting in a reconfiguration action that can be transmitted to the first decoy instance D1, enabling it to reconfigure to address the intrusion event detected at D1.

The IDPS2 signals an update to IDPS1, so that the next time IDPS1 detects the intrusion event trace of the type in the previous paragraph, IDPS1 is able to respond directly to the first decoy instance D1. Optionally, other decoy instances, IDPS instances, and the SOC are updated with the reconfiguration instance for the relevant intrusion of event trace. This enables detection possibilities and reconfiguration possibilities to gradually permeate through the network of decoy instances and IDPS instances to react to a new or an ongoing external attack. This According to an example embodiment, a first decoy instance D1 is configured to transmit an intrusion event characterising a detected, however potential, threat to at least one IDPS1 as an observation request. The IDPS1-4 monitor the device that they are hosted by according to the observation request sent by at least the first decoy instance D1. The monitoring is, for example, to identify a sequence of commands, specific communication patterns, or entities requesting information from device. Optionally, the IDPS1-4 transmit a message to the first decoy instance D1 defining if, and how often, they have already received the observation request for a given intrusion event trace. Based on this feedback, the decoy instance and/or SOC rank the observation request as representing either a threat, or a permissible communication or interaction with the decoy instance D1. This approach allows the monitoring of threats without having knowledge of the full functionality of the monitored device.

According to an embodiment, the device is an electronic control unit comprised in a vehicle. According to embodiment, the device is an electronic control unit comprised in an industrial network, such as an IoT network.

Figure 7:
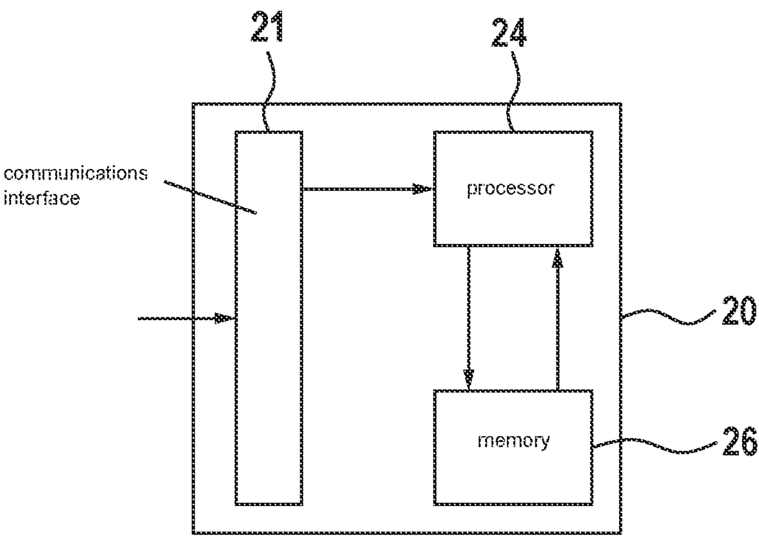
FIG. 7 schematically illustrates a device according to the second aspect of the present invention.

FIG. 7 schematically illustrates a device according to the second aspect.

According to a second aspect, there is provided a device 20 comprising a communications interface 21, a processor 24, and a memory 26. The processor 24 is configured to detect, at a first decoy instance D1 hosted by the device, an intrusion event generated by an intruding instance that is not hosted by the device 20, to generate an intrusion event trace based on the detected intrusion event; and to transmit the intrusion event trace from the first decoy instance D1 to a first intrusion detection instance IDPS1 that is communicably coupled to the device.

The device 20 may, for example, be implemented on an embedded computer capable of convincingly executing the decoy instances discussed herein. Simple decoy services (such as those performing a basic "tripwire" function) can be implemented using a microcontroller having relatively low computational ability. More advanced decoy instances involving emulating an infotainment system, for example, may require an embedded computer having higher performance. The communications interface is, for example, capable of performing communication via one, or more, of Controller Area Network (CANBUS), Local Interconnect Network (LIN), Media Oriented Systems Transport (MOST), or Ethernet. ECUs can also be communicatively coupled using wireless communications such as Wi-Fi™, Bluetooth™, or 3GPP systems. The device is, in an example, communicates using the SOME/IP framework.

FIG. 8 schematically illustrates an intrusion detection system according to the third aspect.

According to a third aspect, there is provided a system 30 comprising a device 20 according to the first aspect or its embodiments, an intrusion detection system IDPS1, and a communications network. The device 20 is configured to communicate at least one intrusion event trace to the intrusion detection system IDPS1 via the communications network 32.

The system 30 is, for example, a vehicular communications system or an industrial communications system. In the case of a vehicular communications system, the line 31 represents elements comprised within a vehicle. For example, communications network 32 is an intra-vehicle communications system such as Controller Area Network (CANBUS), Local Interconnect Network (LIN), Media Oriented Systems Transport (MOST), or Ethernet. ECUs can also be communicatively coupled using wireless communications such as Wi-Fi™, Bluetooth™, or 3GPP systems. The external communication network 34 communicatively couples the system to a security operations center SOC1. Multiple security operations centers SOC2 may be coupled to the first security operation center SOC1.

In an example, the IDPS1 instance is hosted by a functional device of the system 30. For example, each functional instance of a vehicle (such as an infotainment system, or engine control electronics) may comprise an IDPS to protect the functional instance from intrusion. Alternatively, at least one IDPS instance is hosted by a standalone device connected to the communications network 32.

According to an embodiment of the third aspect, the system further comprises a further device 22 according to the second aspect. The further device 22 is configured to communicate a further intrusion event trace to the intrusion detection system IDPS1 via the communications network 32. The intrusion detection system 30 is configured to transmit commands to reconfigure one or both of the embedded devices based on a time relationship between first and second intrusion events, and/or based on a functional comparison of the first and second intrusion events.

According to a fourth aspect, there is provided a computer program element comprising machine readable instructions which, when executed by a processor, cause the processor to perform the computer implemented method the first aspect, or its embodiments.

According to a fifth aspect, there is provided a computer readable medium comprising the computer program element according to the fourth aspect.

The computer readable medium is configured to store a computer program, application, logic including machine code capable of being executed by a processor. The computer readable medium includes RAM, ROM, EEPROM, and other devices that store information that may be used by the processor. In examples, the processor and the computer readable medium are integrated on the same silicon die, or in the same packaging. In examples, the computer readable medium is a hard disc drive, solid state storage device, or the like. In an example, the signal may be communicated over a data communication network such as the Internet as a download, or software update, for example.

The examples provided in the figures and described in the foregoing written description are intended for providing an understanding of the principles of this specification. No limitation to the scope of the present invention is intended thereby. The present specification describes alterations and modifications to the illustrated examples. Only the preferred examples have been presented, and all changes, modifications, and further applications to these within the scope of the specification are desired to be protected.

What is claimed is:

1. A computer-implemented method for intrusion detection, comprising:

detecting, at a first decoy instance hosted by an embedded device connected to a communications network, an intrusion event generated by an intruding instance that is not hosted by the embedded device, wherein the first decoy instance is configured to monitor only a subset of functionalities of the embedded device, thereby reducing consumption of at least one of memory, computational, or communication bandwidth resources of the embedded device;

generating an intrusion event trace based on the detected intrusion event; and transmitting the intrusion event trace from the first decoy instance to a first intrusion detection instance that is communicably coupled to the embedded device.

2. The computer-implemented method according to claim 1, wherein detecting the intrusion event includes:

monitoring at least one attribute of the first decoy instance during runtime;

comparing the at least one attribute to a register of attributes; and when the at least one attribute is determined to be indicative of an intrusion event based on the comparison of the at least one attribute to the register of attributes, asserting that an intrusion event has been detected.

3. The computer-implemented method according to claim 1, further comprising:

receiving, at the first intrusion detection instance, the intrusion event trace from the first decoy instance;

analyzing the intrusion event trace to determine a reconfiguration action to apply to the first decoy instance;

transmitting the reconfiguration action to the first decoy instance; and reconfiguring the first decoy instance based on the analysis of the intrusion event trace.

4. The computer-implemented method according to claim 1, further comprising:

receiving the intrusion event trace at a security operations center;

analyzing the intrusion event trace, using an automated or manual process at the security operations center; and reconfiguring the first decoy instance and/or the first intrusion detection instance based on the analysis.

5. The computer-implemented method according to claim 4, further comprising:

reconfiguring at least a second decoy instance and/or functional instances based on the analysis of the intrusion event trace obtained at the first decoy instance.

6. The computer-implemented method according to claim 1, further comprising:

polling, via the first decoy instance or the first intrusion detection instance, a plurality of further decoy instances and/or further intrusion detection instances with the intrusion event trace;

aggregating, at the first decoy instance or the first intrusion detection instance, a plurality of responses to the intrusion event trace from the plurality of further decoy instances and/or further intrusion detection instances; and reconfiguring the first decoy instance based on the aggregation of the responses from the further decoy instances and/or further intrusion detection instances.

7. The computer-implemented method according to claim 1, further comprising:

upon receiving, at the first intrusion detection instance the intrusion event trace:

monitoring one or more attributes of a device hosting the first decoy instance, determining at least one reaction based on the monitoring of the device, and communicating the reaction to the first decoy instance.

8. The computer-implemented method according to claim 7, further comprising:

detecting, at a second decoy instance hosted by the device, a second intrusion event generated by an intruding instance that is not hosted by the device;

generating a second intrusion event trace based on the second detected intrusion event;

transmitting the second intrusion event trace from the second decoy instance to the first intrusion detection instance that is communicably coupled to the device; and reconfiguring the first and/or second decoy instances based on a time relationship between first and second intrusion events, and/or based on a functional comparison of the first and second intrusion events.

9. The computer-implemented method according to claim 7, wherein the device is an electronic control unit in a vehicle.

10. The computer-implemented method according to claim 1, wherein the intrusion event includes one or any combination of: i) a scan of network ports of the first decoy instance, ii) an attempt to load an application hosted by the first decoy instance, iii) at attempt to enter a predetermined command, or a predetermined combination of commands into an application hosted by the first decoy device, iv) an attempt to download data from the first decoy instance, v) an attempt to write a data payload to a predetermined memory location in the first decoy instance, vi) an attempt to operate an IO device from the first decoy instance, vii) an attempt to communicate with a predetermined network address or URL from the first decoy instance.

11. The computer-implemented method according to claim 1, further comprising:

polling, via the first decoy instance or the first intrusion detection instance, a plurality of further decoy instances and/or further intrusion detection instances by transmitting the intrusion event trace to them;

receiving, from the plurality of further decoy instances and/or further intrusion detection instances, a plurality of responses to the intrusion event trace, each of two or more of the responses including a respective reconfiguration action for responding to the intrusion event trace;

aggregating the plurality of responses to select or determine at least one reconfiguration action to be implemented; and reconfiguring the first decoy instance based on the at least one reconfiguration action determined from the aggregation.

12. The computer-implemented method according to claim 11, further comprising:

receiving, at the first intrusion detection instance, the intrusion event trace from the first decoy instance, wherein the polling and/or the aggregating is performed using the first intrusion detection instance based on the intrusion event trace.

13. The computer-implemented method according to claim 11, wherein the aggregation comprises selecting one reconfiguration action from the plurality of responses.

14. The computer-implemented method according to claim 11, further comprising receiving one or more further responses from one or more intrusion detection and prevention (IDPS) instances, wherein the aggregating further includes aggregating the further responses together with the plurality of responses to determine the at least one reconfiguration action.

15. The computer-implemented method according to claim 11, wherein the embedded device is a first embedded device of a vehicle and the intruding instance is hosted by a further embedded device of the vehicle that is communicatively coupled to the first embedded device via the communications network.

16. The computer-implemented method according to claim 11, further comprising:

transmitting the intrusion event trace at a security operations center; and receiving from the security operations center, an additional response to the intrusion event trace, the additional response including a reconfiguration action, wherein the aggregating further includes aggregating the additional response together with the plurality of responses to determine the at least one reconfiguration action.

17. The computer-implemented method according to claim 1, wherein the subset of functionalities are selected to correspond to threats or intrusion types known, based on one or more previously generated intrusion event traces, to be operating within the communications network.

18. A device, comprising:

a communications interface;

a processor; and a memory;

wherein the processor is configured to:

detect, at a first decoy instance hosted by the device, which is connected to a communications network via the communications interface, an intrusion event generated by an intruding instance that is not hosted by the device, wherein the first decoy instance is configured to monitor only a subset of functionalities of the device, thereby reducing consumption of at least one of memory, computational, or communication bandwidth resources of the device;

generate an intrusion event trace based on the detected intrusion event;

transmit the intrusion event trace from the first decoy instance to a first intrusion detection instance that is communicably coupled to the device.

19. A system, comprising:

an intrusion detection system;

a communications network; and a device, including:

a communications interface;

a memory; and a processor;

wherein the processor is configured to:

detect, at a first decoy instance hosted by the device, an intrusion event generated by an intruding instance that is not hosted by the device, wherein the first decoy instance is configured to monitor only a subset of functionalities of the device, thereby reducing consumption of at least one of memory, computational, or communication bandwidth resources of the device;

generate an intrusion event trace based on the detected intrusion event; and transmit the intrusion event trace from the first decoy instance to the intrusion detection system via the communications network.

20. The system according to claim 19, further comprising:

a further device including a communications interface, a processor, and a memory;

wherein the further device is configured to communicate a further intrusion event trace to the intrusion detection system via the communications network; and wherein the intrusion detection system is configured to transmit commands to reconfigure one or both of the device and the further device based on a time relationship between first and second intrusion events, and/or based on a functional comparison of the first and second intrusion events.

21. A non-transitory computer readable medium on which is stored a computer program including machine readable instructions for intrusion detection, the machine readable instructions, when executed by a processor, causing the processor to perform the following steps:

detecting, at a first decoy instance hosted by an embedded device connected to a communications network, an intrusion event generated by an intruding instance that is not hosted by the embedded device, wherein the first decoy instance is configured to monitor only a subset of functionalities of the embedded device, thereby reducing consumption of at least one of memory, computational, or communication bandwidth resources of the embedded device;

generating an intrusion event trace based on the detected intrusion event; and transmitting the intrusion event trace from the first decoy instance to a first intrusion detection instance that is communicably coupled to the embedded device.

* * * * *